(12) United States Patent
Terada et al.

(10) Patent No.: US 6,816,591 B2
(45) Date of Patent: Nov. 9, 2004

(54) VOICE SWITCHING SYSTEM AND VOICE SWITCHING METHOD

(75) Inventors: Yasuhiro Terada, Kanagawa-ken (JP); Takefumi Ura, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 670 days.

(21) Appl. No.: 09/928,934

(22) Filed: Aug. 13, 2001

(65) Prior Publication Data

US 2002/0021798 A1 Feb. 21, 2002

(30) Foreign Application Priority Data

Apr. 14, 2000 (JP) ........................................ 2000-245816

(51) Int. Cl.[7] ............................. H04M 1/00; H04M 9/08
(52) U.S. Cl. .............. 379/406.01; 379/347; 379/406.07; 379/406.16
(58) Field of Search ...................... 379/406.01, 406.06, 379/406.07, 406.08, 406.15, 406.16; 455/226.1, 226.2; 370/278, 288

(56) References Cited

U.S. PATENT DOCUMENTS 5,657,422 A * 8/1997 Janiszewski et al. ........ 704/229
5,696,821 A * 12/1997 Urbanski ................ 379/406.07
5,920,834 A * 7/1999 Sih et al. ..................... 704/233
6,061,647 A * 5/2000 Barrett ........................ 704/208
6,434,110 B1 * 8/2002 Hemkumar .................. 370/201

* cited by examiner

Primary Examiner—Curtis Kuntz
Assistant Examiner—Tuan Pham
(74) Attorney, Agent, or Firm—Pearne & Gordon LLP

(57) ABSTRACT

There are provided a voice switching system and a voice switching method which are capable of carrying out highly accurate voice detection and performing a switching action properly even in the presence of an unstationary noise or under circumstances where the S/N ratio is low. The voice switching system comprises a receiving-side voice detection processing section which carries out the voice detection processing of a reception signal, a transmitting-side voice detection processing section which carries out the voice detection processing of a transmission signal, and a loss controlling section which controls the losses of a reception voice attenuator which attenuates the reception signal and a transmission voice attenuator which attenuates the transmission signal according to the results of the voice detection processings, and in the receiving-side voice detection processing section and transmitting-side voice detection processing section, a noise level estimate is computed from the amplitude level of the reception signal or the transmission signal at a predetermined interval, and a threshold computed from the noise level estimate is compared with the reception signal or the transmission signal to detect a voice.

14 Claims, 7 Drawing Sheets

L(k) : Input signal level
N(k) : Noise level estimate
k : Sample No. or Frame No.
$L_{up}$ : Updating amount($\geq 1$)
Th : Threshold
Ini : Noise level estimate initialization period L(k)   : Input signal level
N(k)   : Noise level estimate
k      : Sample No. or Frame No.
Lup    : Updating amount($\geq 1$)
Th     : Threshold
$\beta$      : Judgment coefficient
$\beta$ max, $\gamma$ : Constant
Ini    : Noise level estimate initialization period L(k)         : Input signal level
N(k)         : Noise level estimate
k            : Sample No. or Frame No.
Lup          : Updating amount(≥1)
Lup_on, Lup_off : Constant
Th           : Threshold
Ini          : Noise level estimate initialization period

VOICE SWITCHING SYSTEM AND VOICE SWITCHING METHOD

BACKGROUND OF THE INVENTION (i) Field of the Invention

The present invention relates to a voice switching system for and a voice switching method of removing sound echoes and reducing occurrence of howling in sound reinforced communication systems such as hands-free telephones and teleconference systems which are on their ways to becoming popular in recent years.

(ii) Description of the Related Art

There have so far been developed a wide variety of sound reinforced communication systems each of which makes it possible for many people to talk with one another each with one set of hands-free speaker and microphone.

The sound reinforced communication system of this type is in general equipped with at least one pair of hands-free telephone units, i.e., first and second hands-free telephone units positioned in respective closed near-end and far-end rooms distant far away from each other and each having one set of hand-free speaker and microphone, thereby making it possible for two operators to communicate with each other by the speakers and microphones of the first and second hands-free telephone units through a special transmission line having the first and second hands-free telephone units electrically connected with each other. The speaker and microphone forming parts of the hands-free telephone unit begins to be operated when the operator inputs his or her voice to the microphone, so that the reinforced communication unit has another name called "a voice switching system".

One of typical examples among those conventional voice switching systems is disclosed, for example, in Japanese Patent Application Laid-Open No. 62151/1990.

The conventional voice switching system disclosed in this Japanese publication is shown in FIG. 7 as comprising a reception voice attenuator 702 designed to attenuate the reception signal inputted from a signal input terminal 701 to output the attenuated signal to a speaker 703, a transmission voice attenuator 705 adapted to attenuate the transmission signal inputted from a microphone 704 to output the attenuated signal to an output terminal 706, a receiving-side voice detection processing section 707 operative to carry out voice detection processing on the inputted reception signal, a transmitting-side voice detection processing section 713 functioning to carry out voice detection processing on the inputted transmission signal, and a loss controlling section 719 serving to control the losses of the reception voice attenuator 702 and the transmission voice attenuator 705.

The receiving-side voice detection processing section 707 thus constructed comprises a signal level computing section 708 which computes the amplitude level of the reception signal inputted from the signal input terminal 701, a time constant selecting section 709 which selects a time constant used when a minimum reception signal level is computed, a minimum signal level computing section 710 which computes the minimum reception signal level, a threshold computing section 711 which computes a threshold from the minimum reception signal level computed in the minimum signal level computing section 710, and a voice detecting section 712 which carries out voice detection according to the reception signal level and the threshold. The amplitude level computed in the signal level computing section 708 is a reception signal level obtained by rectifying and smoothing the reception signal.

The transmitting-side voice detection processing section 714 further comprises a signal level computing section 714 which computes the amplitude level of the transmission signal inputted from the microphone 704, a time constant selecting section 715 which selects a time constant used when a minimum transmission signal level is computed, a minimum signal level computing section 716 which computes the minimum transmission signal level, a threshold computing section 717 which computes a threshold from the minimum transmission signal level computed in the minimum signal level computing section 716, and a voice detecting section 718 which carries out voice detection according to the transmission signal level and the threshold. The amplitude level computed in the signal level computing section 714 is a transmission signal level obtained by rectifying and smoothing the transmission signal.

The following description will be directed to the operation of the above conventional voice switching system with reference to FIG. 7.

When a reception signal, i.e., the voice signal of a far-end speaker is inputted to the signal input terminal 701, the reception signal is outputted to a near-end speaker from the speaker 703 by way of the reception voice attenuator 702. The microphone 704 is then operated to collect the voice outputted from the speaker 703 and the voice of the near-end speaker speaking to the microphone 704 to output a transmission signal. This transmission signal becomes a transmission output signal via the transmission voice attenuator 705, and the transmission output signal is outputted to the far-end speaker from the signal output terminal 706.

Description will then be given to the receiving-side voice detection processing section 707 and transmitting-side voice detection processing section 713 required to compute the losses to be inserted into the reception voice attenuator 702 and the transmission voice attenuator 705 by the loss controlling section 719. Only the receiving-side voice detection processing section 707 will appear because the receiving-side voice detection processing section 707 and the transmitting-side voice detection processing section 713 are operated in the same manner.

In the signal level computing section 708, the amplitude level of a reception signal in each sample or frame (multiple samples) is computed to obtain a signal level Lri(k) in which the legend "k" represents a sample number or a frame number. In the time constant selecting section 709, a time constant "Tr" is determined according to the amplitude level of the reception signal. In the minimum signal level computing section 710, a minimum reception signal level Nr(k) is computed by the smoothing processing of the following equation 1 using this time constant.

$$Nr(k)=Nr(k-1)+Tr(Lr(k)-Nr(k-1)) \quad \text{(equation 1)}$$

In the threshold computing section 711, a threshold "Thr" for voice detection is computed by the following equation 2 based on the minimum reception signal level Nr(k), $$Thr=\alpha \cdot Nr(k) \quad \text{(equation 2)}$$

wherein the legend "α" is indicative of a coefficient for computing the threshold.

In the voice detecting section 712, the reception signal level Lri(k) is compared with the threshold "Thr", and when the reception signal level is higher than the threshold, it is determined that a voice is present, while when the reception signal level is lower than the threshold, it is determined that no voice is present.

The methods of computing and controlling the losses in the loss controlling section 719 will then be described hereinafter.

The loss controlling section 719 is firstly operated to have a transmission signal level Lsi(k) compared with a reception output signal level Lro(k) obtained by multiplying the reception signal level Lri(k) by a receiving-side loss "Gr", and a sound echo path gain "αh" is computed by the following equation.

$$\alpha h = Lsi\ (k)/Lro(k) \quad \text{(equation 3)}$$

The loss controlling section 719 is similarly operated to have a reception signal level Lri(k) compared with a transmission output signal level Lso(k) obtained by multiplying the transmission signal level Lsi(k) by a transmitting-side loss Gs, and a circuit echo path gain "βh" is computed by the following equation.

$$\beta h = Lri(k)/Lso(k) \quad \text{(equation 4)}$$

Computed by the following equation with the sound echo path gain "βh" and the circuit echo path gain "βh" is an insertion loss "G", $$G = Hm/(Mc \cdot \alpha h \cdot \beta h) \quad \text{(equation 5)}$$

wherein Mc is a correction coefficient and "Hm" is a howling margin.

In the loss controlling section 719, it is determined based on the results of the determinations in the voice detecting section 712 and the voice detecting section 718 whether the system is in a reception state or a transmission state. When the system is held in the reception state, the loss of the reception voice attenuator 702 is gradually decreased while the loss of the transmission voice attenuator 705 is gradually increased toward a target value which is the insertion loss "G" computed on the basis of the equation 5. When, on the other hand, the system is held in the transmission state, the loss of the reception voice attenuator 702 is gradually increased toward a target value, i.e., the insertion loss "G" computed on the basis of the equation 5 while the loss of the transmission voice attenuator 705 is gradually decreased.

The switching system thus constructed in the above is operated to compare the voice of the near-end speaker with that of the far-end speaker and to control the loss of the transmission voice and that of the reception voice relatively to each other in such a manner that the one of higher level is outputted without being attenuated and the one of lower level is outputted after attenuated, thereby making it possible to lessen echoes from the speaker as well as to reduce the howling caused by the combined sounds from the near-end speaker and the far-end speaker to a minimum level.

The voice detection process performed in the above conventional voice switching system is, however, forced to have the time constant set at a relatively large value with small fluctuations by tracing the minimum signal level when the minimum signal level is computed by the smoothing processing expressed by the equation 1.

The conventional voice switching system therefore encounters such a problem that although it can estimate the minimum signal level accurately when the ratio (SN) of sound signal to noise signal is high, it cannot track a change in the level of an unstationary noise produced in a vehicle when the vehicle accelerates or decelerates or at a platform when a train leaves or stops at the station, thereby causing a degradation in the performance of the voice switching system.

The conventional voice switching system has another problem that the low S/N ratio tends to cause noises detected as a voice, thereby deteriorating the operational performance of the voice switching system.

It is therefore an object of the present invention to provide a voice switching system and a voice switching method which can solve such problems inherent to the prior art voice switching system.

It is another object of the present invention to provide a voice switching system and a voice switching method which are capable of carrying out highly accurate voice detection and performing a switching action properly even with the levels of noises abruptly generated and fluctuated under circumstances where the S/N ratio is low.

SUMMARY OF THE INVENTION

The voice switching system according to the present invention comprises a receiving-side voice detection processing section which carries out the voice detection processing of a reception signal, a transmitting-side voice detection processing section which carries out the voice detection processing of a transmission signal, a reception voice attenuator which attenuates the above reception signal, a transmission voice attenuator which attenuates the above transmission signal, and a loss controlling section which controls the losses of the above reception voice attenuator and the above transmission voice attenuator according to the results of the voice detection processings of the above receiving-side voice detection processing section and the above transmitting-side voice detection processing section. The above receiving-side voice detection processing section and the above transmitting-side voice detection processing section each comprises a signal level computing section which computes the amplitude level of the above reception signal or the above transmission signal in each predetermined sample or frame, a noise level estimating section which computes a noise level estimate from the signal outputted from this signal level computing section, a threshold computing section which computes a threshold for detecting a voice from the above noise level estimate, and a voice detecting section which compares the above reception signal or the above transmission signal with the above threshold to detect a voice.

Therefore, according to the present invention, a noise level estimate having trackability to an unstationary noise whose level changes constantly can be computed, the occurrence of misdetection of a voice can be reduced even under circumstances where the S/N ratio is low, the presence or absence of a voice can be detected more distinctly, and more accurate voice detection than the conventional voice switching system can be carried out.

Further, the voice switching system of the present invention comprises a receiving-side voice detection processing section which carries out the voice detection processing of a reception signal, a transmitting-side voice detection processing section which carries out the voice detection processing of a transmission signal, a reception voice attenuator which attenuates the above reception signal, a transmission voice attenuator which attenuates the above transmission signal, and a loss controlling section which controls the losses of the above reception voice attenuator and the above transmission voice attenuator according to the results of the voice detection processings of the above receiving-side voice detection processing section and the above transmitting-side voice detection processing section. The above receiving-side voice detection processing section and the above transmitting-side voice detection processing section each comprises a signal level computing section which computes the amplitude level of the above reception signal or the above transmission signal in each predetermined sample or frame, a noise level estimating section which computes a noise level estimate from the signal outputted from this signal level computing section, a threshold updating section which computes a threshold for detecting a voice from the above noise level estimate and updates the above threshold according to the above noise level estimate and the above signal level, and a voice detecting section which compares the above reception signal or the above transmission signal with the above threshold to detect a voice.

Therefore, according to the present invention, a noise level estimate having trackability to an unstationary noise whose level changes constantly can be computed, the occurrence of misdetection of a voice can be reduced even under circumstances where the S/N ratio is low, the presence or absence of a voice can be detected more distinctly, and more accurate voice detection than the conventional voice switching system can be carried out by updating the threshold for voice detection according to the noise level estimate.

Further, the voice switching system of the present invention comprises a receiving-side voice detection processing section which carries out the voice detection processing of a reception signal, a transmitting-side voice detection processing section which carries out the voice detection processing of a transmission signal, a reception voice attenuator which attenuates the above reception signal, a transmission voice attenuator which attenuates the above transmission signal, and a loss controlling section which controls the losses of the above reception voice attenuator and the above transmission voice attenuator according to the results of the voice detection processings of the above receiving-side voice detection processing section and the above transmitting-side voice detection processing section. The above receiving-side voice detection processing section and the above transmitting-side voice detection processing section each comprises a signal level computing section which computes the amplitude level of the above reception signal or the above transmission signal in each predetermined sample or frame, a noise level estimating section which computes a noise level estimate from the signal outputted from this signal level computing section, a threshold computing section which computes a threshold for detecting a voice from the above noise level estimate, a voice detecting section which compares the above reception signal or the above transmission signal with the above threshold to detect a voice, and an updating amount setting section which sets the updating amount of the noise level estimate in the above noise level estimating section according to the result of the detection of this voice detecting section.

Therefore, according to the present invention, a noise level estimate having trackability to an unstationary noise whose level changes constantly can be computed, the occurrence of misdetection of a voice can be reduced even under circumstances where the S/N ratio is low, the presence or absence of a voice can be detected more distinctly, and more accurate voice detection having more trackability than the conventional voice switching system can be carried out by changing the updating amount of the noise level estimate according to the result of the voice detection.

Further, in the above threshold updating section of the voice switching system of the present invention, when the signal level computed in the above signal level computing section is higher than the value obtained by multiplying the noise level estimate computed in the above noise level estimating section by a predetermined constant, a judgment coefficient for setting the above threshold is set to be a predetermined small value; when the above signal level is lower than the value obtained by multiplying the above noise level estimate by the above predetermined constant, the above judgment coefficient is set to be a larger value progressively; and when the above judgment coefficient becomes larger than a predetermined judgment value, the above judgment factor is set to be the above predetermined judgment value.

Therefore, according to the present invention, highly accurate voice detection having trackability can be carried out by updating the threshold according to the signal level.

In the above updating amount setting section of the voice switching system of the present invention, when the signal level computed in the above signal level computing section is higher than the threshold computed in the above threshold computing section, it is determined that a voice is present, while when the above signal level is lower than the above threshold, it is determined that no voice is present, and the updating amount of the noise level estimate in the above noise level estimating section is changed according to the result of this voice detection.

Therefore, according to the present invention, highly accurate voice detection having trackability can be carried out by changing the updating amount of the noise level estimate according to the result of the voice detection.

The voice switching system of the present invention further comprises a counting section which counts the number of samples or frames or time after the activation of the system and an initialization performing section which performs the initialization of a noise level estimate for a predetermined time period, thereby performing the initialization of the noise level estimate for a predetermined time period after the activation of the system.

Therefore, according to the present invention, by performing the initialization of the noise level estimate for a predetermined time period after the activation of the system, not only the trackability to noise in the noise level estimate immediately after the activation of the system but also the performance of the voice switching system can be improved.

In the above noise level estimating section of the voice switching system of the present invention, when the above signal level is lower than the above noise level estimate, the above signal level is set to be the above noise level estimate, while when the signal level is higher than the noise level estimate, the noise level estimate is set to be a larger value progressively.

Therefore, according to the present invention, when the signal level is higher than the noise level estimate, the noise level estimate is set to be a larger value progressively, thereby improving the performance of the voice switching system properly.

The voice switching method of the present invention performs a receiving-side voice detection processing step in which the voice detection processing of a reception signal is carried out, a transmitting-side voice detection processing step in which the voice detection processing of a transmission signal is carried out, a reception voice attenuating step in which the above reception signal is attenuated, a transmission voice attenuating step in which the above transmission signal is attenuated, and a loss controlling step in which the losses of the above reception voice attenuating step and the above transmission voice attenuating step are controlled according to the results of the voice detection processings of the above receiving-side voice detection processing step and the above transmitting-side voice detection processing step.

The above receiving-side voice detection processing step and the above transmitting-side voice detection processing step each performs a signal level computing step in which the amplitude level of the above reception signal or the above transmission signal is computed in each predetermined sample or frame, a noise level estimating step in which a noise level estimate is computed from the signal outputted from this signal level computing step, a threshold computing step in which a threshold for detecting a voice is computed from the above noise level estimate, and a voice detecting step in which the above reception signal or the above transmission signal is compared with the above threshold to detect a voice.

Therefore, according to the present invention, the estimation of a noise level estimate having trackability to an unstationary noise whose level changes constantly can be made, the occurrence of misdetection of a voice can be reduced even under circumstances where the S/N ratio is low, the presence or absence of a voice can be detected more distinctly, and more accurate voice detection than the conventional voice switching system can be carried out.

Further, the voice switching method of the present invention performs a receiving-side voice detection processing step in which the voice detection processing of a reception signal is carried out, a transmitting-side voice detection processing step in which the voice detection processing of a transmission signal is carried out, a reception voice attenuating step in which the above reception signal is attenuated, a transmission voice attenuating step in which the above transmission signal is attenuated, and a loss controlling step in which the losses of the above reception voice attenuating step and the above transmission voice attenuating step are controlled according to the results of the voice detection processings of the above receiving-side voice detection processing step and the above transmitting-side voice detection processing step. The above receiving-side voice detection processing step and the above transmitting-side voice detection processing step each performs a signal level computing step in which the amplitude level of the above reception signal or the above transmission signal is computed in each predetermined sample or frame, a noise level estimating step in which a noise level estimate is computed from the signal outputted from this signal level computing step, a threshold updating step in which a threshold for detecting a voice is computed from the above noise level estimate and updates the above threshold according to the above noise level estimate and the above signal level, and a voice detecting step in which the above reception signal or the above transmission signal is compared with the above threshold to detect a voice.

Therefore, according to the present invention, a noise level estimate having trackability to an unstationary noise whose level changes constantly can be computed, the occurrence of misdetection of a voice can be reduced even under circumstances where the S/N ratio is low, the presence or absence of a voice can be detected more distinctly, and more accurate voice detection than the conventional voice switching system can be carried out by updating the threshold for voice detection according to the noise level estimate.

Further, the voice switching method of the present invention performs a receiving-side voice detection processing step in which the voice detection processing of a reception signal is carried out, a transmitting-side voice detection processing step in which the voice detection processing of a transmission signal is carried out, a reception voice attenuating step in which the above reception signal is attenuated, a transmission voice attenuating step in which the above transmission signal is attenuated, and a loss controlling step in which the losses of the above reception voice attenuating step and the above transmission voice attenuating step are controlled according to the results of the voice detection processings of the above receiving-side voice detection processing step and the above transmitting-side voice detection processing step. The above receiving-side voice detection processing step and the above transmitting-side voice detection processing step each comprises a signal level computing step in which the amplitude level of the above reception signal or the above transmission signal is computed in each predetermined sample or frame, a noise level estimating step in which a noise level estimate is computed from the signal outputted from this signal level computing step, a threshold computing section in which a threshold for detecting a voice is computed from the above noise level estimate, a voice detecting step in which the above reception signal or the above transmission signal is compared with the above threshold to detect a voice, and an updating amount setting step in which the updating amount of the noise level estimate in the above noise level estimating step is set according to the result of the detection of this voice detecting step.

Therefore, according to the present invention, a noise level estimate having trackability to an unstationary noise whose level changes constantly can be computed, the occurrence of misdetection of a voice can be reduced even under circumstances where the S/N ratio is low, the presence or absence of a voice can be detected more distinctly, and more accurate voice detection having more trackability than the conventional voice switching system can be carried out by changing the updating amount of the noise level estimate according to the result of the voice detection.

Further, in the above threshold updating step of the voice switching method of the present invention, when the signal level computed in the above signal level computing step is higher than the value obtained by multiplying the noise level estimate computed in the above noise level estimating step by a predetermined constant, a judgment coefficient for setting the above threshold is set to be a predetermined small value; when the above signal level is lower than the value obtained by multiplying the above noise level estimate by the above predetermined constant, the above judgment coefficient is set to be a larger value progressively; and when the above judgment coefficient becomes larger than a predetermined judgment value, the above judgment coefficient is set to be the above predetermined judgment value.

Therefore, according to the present invention, highly accurate voice detection having trackability can be carried out by updating the threshold according to the signal level.

In the above updating amount setting step of the voice switching method of the present invention, when the signal level computed in the above signal level computing step is higher than the threshold computed in the above threshold computing step, it is determined that a voice is present, while when the above signal level is lower than the above threshold, it is determined that no voice is present, and the updating amount of the noise level estimate in the above noise level estimating step is changed according to the result of this voice detection.

Therefore, according to the present invention, highly accurate voice detection having trackability can be carried out by changing the updating amount of the noise level estimate according to the result of the voice detection.

The voice switching method of the present invention further performs a counting step in which the number of samples or frames or time after the activation of the system is counted and an initialization performing step in which the initialization of a noise level estimate is performed for a predetermined time period, thereby performing the initialization of the noise level estimate for a predetermined time period after the activation of the system.

Therefore, according to the present invention, by performing the initialization of the noise level estimate for a predetermined time period after the activation of the system, not only the trackability to noise in the noise level estimate immediately after the activation of the system but also the performance of the voice switching system can be improved.

In the above noise level estimating step of the voice switching method of the present invention, when the above signal level is lower than the above noise level estimate, the above signal level is set to be the above noise level estimate, while when the above signal level is higher than the above noise level estimate, the noise level estimate is set to be a larger value progressively.

Therefore, according to the present invention, when the above signal level is higher than the above noise level estimate, the noise level estimate is set to be a larger value progressively, thereby improving the performance of the voice switching system properly.

BRIEF DESCRIPTION OF THE DRAWINGS

The present invention and may of the attendant advantages thereof will be better understood from the following detailed description when considered in connection with the accompanying drawings, wherein.

DESCRIPTION OF THE PREFERRED EMBODIMENTS

The following description will be directed to a plurality of preferred embodiments of the voice switching system according to the present invention.

The first embodiment of the voice switching system according to the present invention will now be described with reference to the drawings, in particular, to FIGS. 1 to 6.

The construction of the voice switching system according to the first embodiment of the present invention will firstly be described.

Figure 1:
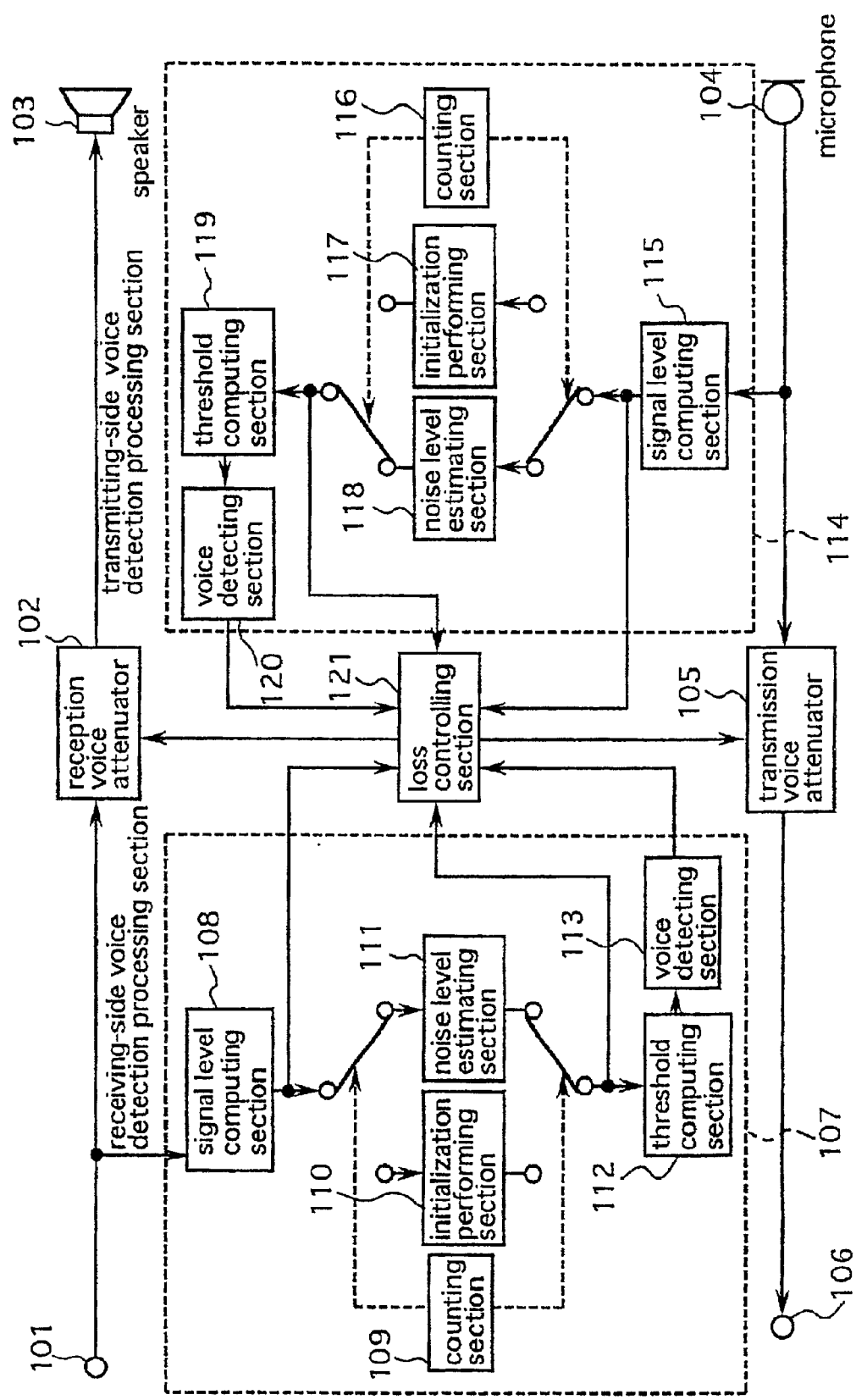
FIG. 1 is a block diagram of the first embodiment of the voice switching system according to the present invention.

The first embodiment of the voice switching system according to the present invention is shown in FIG. 1 as comprising a reception voice attenuator 102 designed to attenuate the reception signal inputted from a signal input terminal 101 and outputs the attenuated signal to a speaker 103, a transmission voice attenuator 105 adapted to attenuate the transmission signal inputted from a microphone 104 to output the attenuated signal to an output terminal 106, a receiving-side voice detection processing section 107 for carrying out a voice detection processing with the inputted reception signal, a transmitting-side voice detection processing section 114 for carrying out a voice detection processing with the inputted transmission signal, and a loss controlling section 121 operative to control the losses of the reception voice attenuator 102 and the transmission voice attenuator 105.

The receiving-side voice detection processing section 107 further comprises a signal level computing section 108 designed to compute the amplitude level of the reception signal inputted from the signal input terminal 101, a counting section 109 adapted to count the number of samples or frames or the like after the activation of the voice switching system of the present invention, an initialization performing section 110 operative to initialize a noise level estimate, a noise level estimating section 111 operative to compute the noise level estimate, a threshold computing section 112 operative to compute a threshold from the noise level estimate, and a voice detecting section 113 serving to compare the reception signal with the threshold to carry out voice detection.

The transmitting-side voice detection processing section 114 further comprises a signal level computing section 115 adapted to compute the amplitude level of the transmission signal inputted from the microphone 104, a counting section 116 designed to count the number of samples or frames or the like after the activation of the voice switching system of the present invention, an initialization performing section 117 operative to perform the initialization of a noise level estimate, a noise level estimating section 118 adapted to perform the computation of the noise level estimate, a threshold computing section 119 serving to compute a threshold from the noise level estimate, and a voice detecting section 120 adapted to compare the transmission signal with the threshold to carry out voice detection.

The following description will be given to the operation of the thus-configured voice switching system of the first embodiment of the present invention with reference to FIG. 1.

Figure 7:
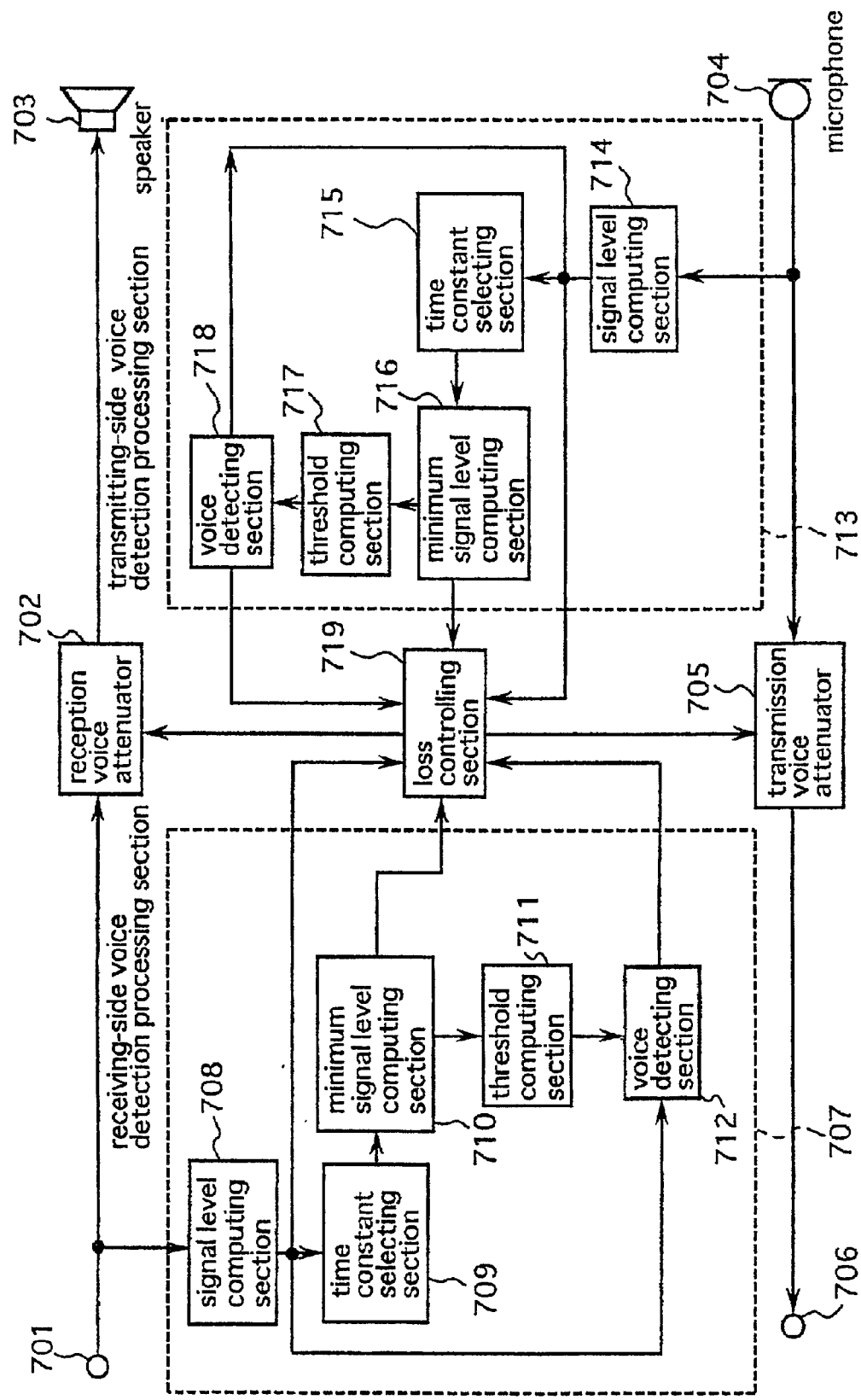
FIG. 7 is a block diagram of the conventional voice switching system.

The operations of the reception voice attenuator 102, transmission voice attenuator 105, signal level computing section 108, threshold computing section 112, voice detecting section 113, signal level computing section 115, threshold computing section 119, voice detecting section 120 and loss controlling section 121 are performed in the similar manner to the operations of their counterparts of the prior art shown in FIG. 7.

At first, the signal level computing section 108 is operated to compute a reception signal level and to compare the reception signal level with the noise level estimate which has already been estimated based on the last sample or frame in the noise level estimating section 111. When the noise level estimate is higher than the signal level, the noise level estimate is set to be the signal level. When, on the other hand, the noise level estimate is lower than the signal level, the noise level estimate is updated by multiplying the noise level estimate by the updating amount which is set to be a value of 3 to 10 dB per second so that it can track a varying noise and that it does not react to a voice. The above updating process makes it possible to improve the noise level estimate with the trackability to various unstationary noises whose levels changes constantly.

Over a few samples or frames after the activation of the voice switching system, the values of the signal levels computed in the signal level computing section 108 are small, and when the estimation processing of the noise level estimate is carried out in the noise level estimating section 111 with the small signal level, the initial value of the noise level estimate also becomes small. The initialization processing of the initialization performing section 110 is therefore performed to have the signal level directly taken as a noise level estimate until the noise level estimate reaches a stationary signal level after the activation of the voice switching system. This is because the fact that it is difficult to perform the proper computation of the noise level estimate until the updated noise level estimate reaches the signal level, whereby the misdetection of a voice may possibly occur in the voice detecting section 113.

The counting section 109 is then operated to perform the switching between the initialization performing section 110 and the noise level estimating section 111. The counting section 109 starts counting on activation of the voice switching system, and when the count is smaller than the predetermined number of samples or frames or predetermined time, the initialization of the noise level estimate is performed in the initialization performing section 110. On the other hand, when the count becomes larger than the predetermined number of samples or frames or the predetermined time, the counting section 109 switches from the initialization performing section 110 to the noise level estimating section 111 to update the noise level estimate in the noise level estimating section 111.

Although a description has been heretofore given to the receiving-side voice detection processing section 107, the transmitting-side voice detection processing section 114 carries out voice detection processing on a transmission signal in the same manner as the receiving-side voice detection processing section 107 does and, as described above, comprises the signal level computing section 115, the counting section 116, the initialization performing section 117, the noise level estimating section 118, the threshold computing section 119 and the voice detecting section 120.

As described above, the voice switching system of the first embodiment of the present invention has the effect that it is capable of computing a noise level estimate which has trackability to an unstationary noise whose level changes constantly, reducing the occurrence of misdetection of a voice under circumstances where the S/N ratio is low, detecting the presence or absence of a voice more distinctly, and carrying out more accurate voice detection than the conventional voice switching system.

Figure 2:
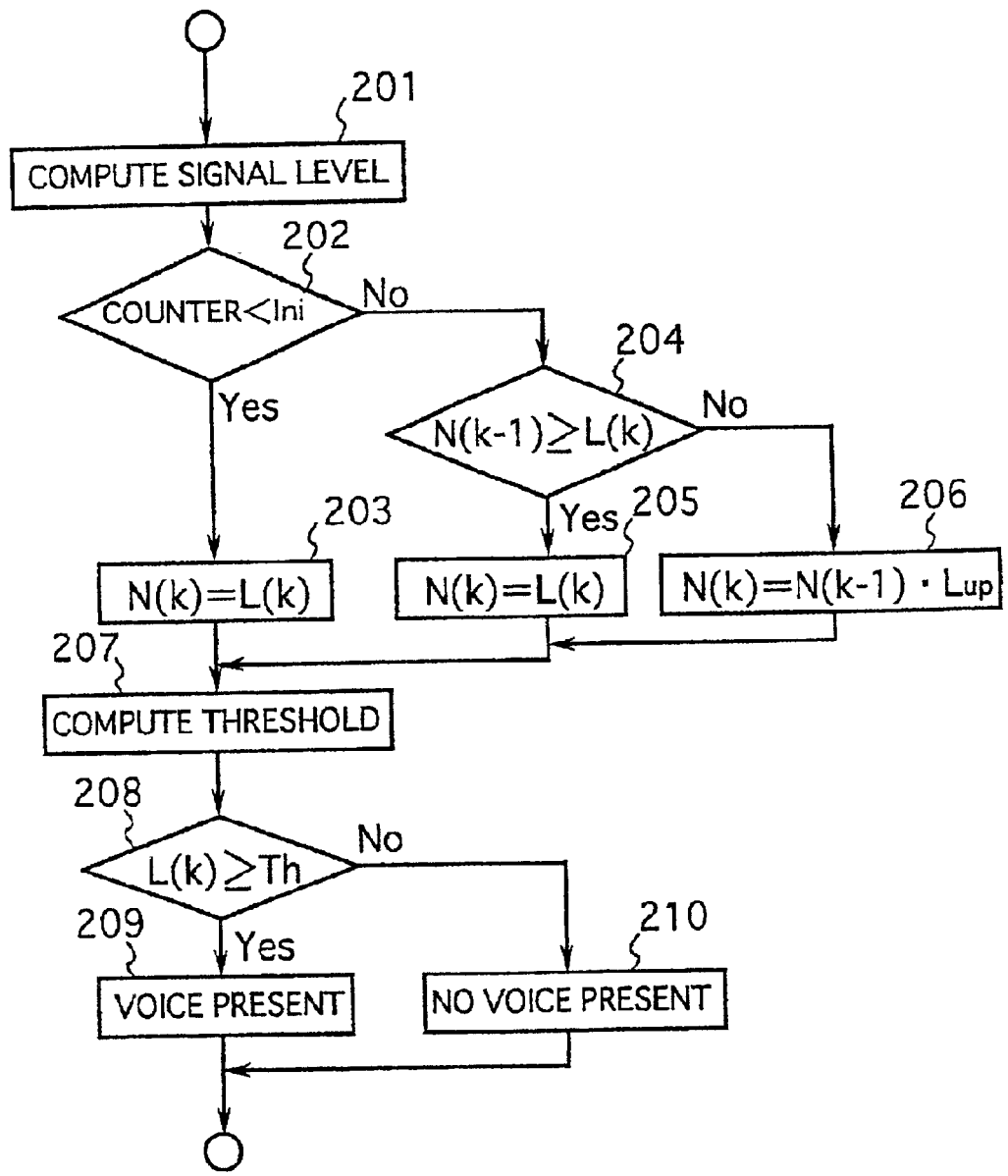
FIG. 2 is a flow diagram showing the process for implementing the first embodiment of the present invention by software.

FIG. 2 shows the process for implementing the first embodiment of the present invention by software.

The process shown in FIG. 2 comprises a plurality of processing steps consisting of a signal level computing step 201, a count comparing step 202, an initial noise level value setting step 203, a noise level comparing step 204, a noise level setting step 205, a noise level updating step 206, a threshold computing step 207, a voice detection comparing step 208, a voice detection judging step 209 and a no-voice detection judging step 210. These steps are the same as those carried out by the receiving-side voice detection processing section 107 comprising the signal level computing section 108 through the voice detecting section 113 and the transmitting-side voice detection processing section 114 comprising the signal level computing section 115 through the voice detecting section 120 which are shown in FIG. 1.

Figure 3:
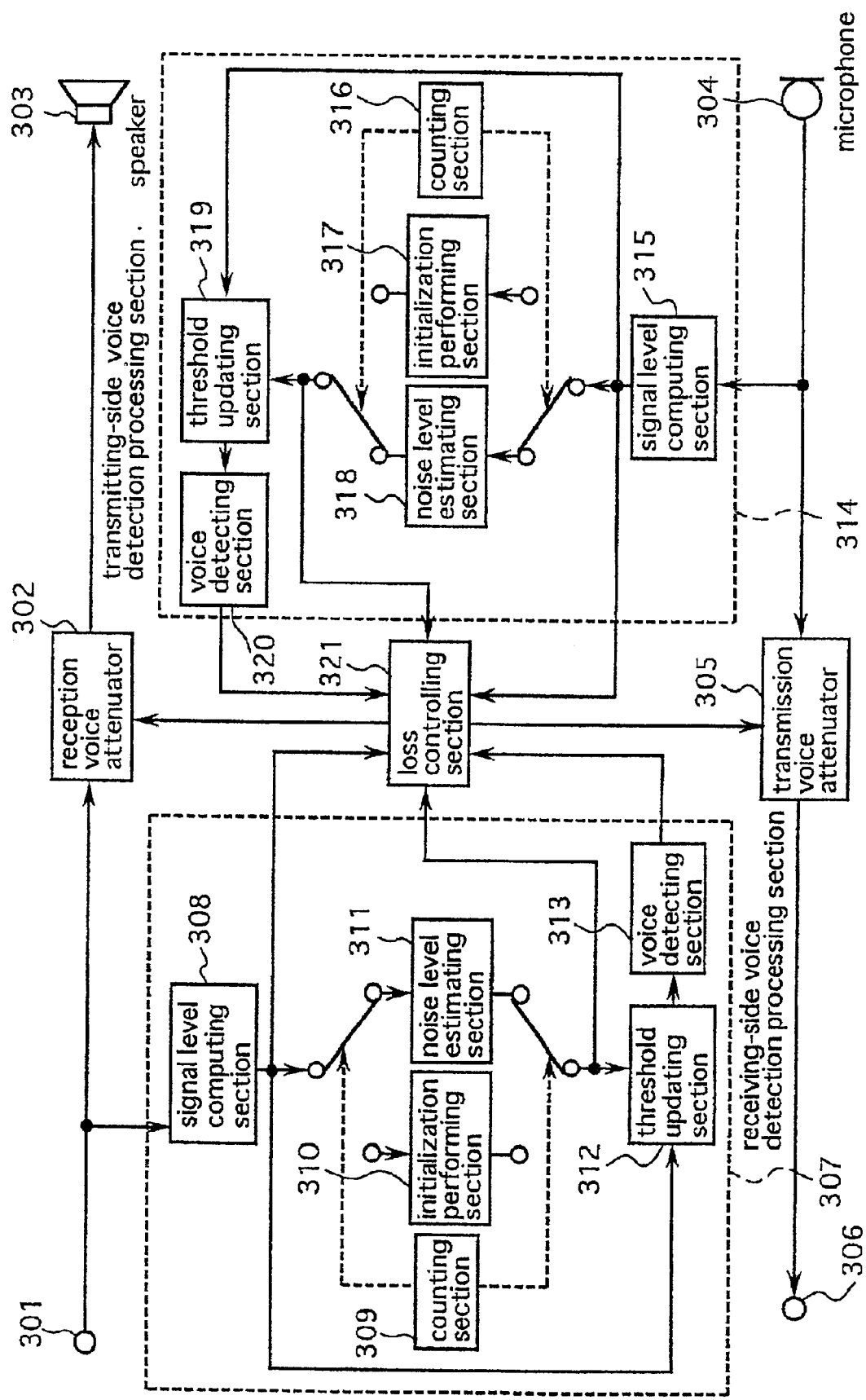
FIG. 3 is a block diagram of the second embodiment of the voice switching system according to the present invention.

FIG. 3 illustrates the voice switching system of the second embodiment of the present invention.

In FIG. 3, the voice switching system of the second embodiment of the present invention comprises a reception voice attenuator 302 operative to attenuate the reception signal inputted from a signal input terminal 301 and to output the attenuated signal to a speaker 303, a transmission voice attenuator 305 adapted to attenuate the transmission signal inputted from a microphone 304 and to output the attenuated signal to an output terminal 306, a receiving-side voice detection processing section 307 in which voice detection processing is carried out on the inputted reception signal, a transmitting-side voice detection processing section 314 in which voice detection processing is carried out on the inputted transmission signal, and a loss controlling section 321 adapted to control the losses of the reception voice attenuator 302 and the transmission voice attenuator 305.

The receiving-side voice detection processing section 307 further comprises a signal level computing section 308 which computes the amplitude level of the reception signal inputted from the signal input terminal 301, a counting section 309 which counts the number of samples or frames or the like after the activation of the voice switching system of the present invention, an initialization performing section 310 which performs the initialization of a noise level estimate, a noise level estimating section 311 which performs the computation of the noise level estimate, a threshold updating section 312 which updates a threshold according to the noise level estimate, and a voice detecting section 313 which compares the reception signal with the threshold to carry out voice detection.

The transmitting-side voice detection processing section 314 further comprises a signal level computing section 315 designed to compute the amplitude level of the transmission signal inputted from the microphone 304, a counting section 316 adapted to count the number of samples or frames or the like after the activation of the voice switching system of the present invention, an initialization performing section 317 serving to perform the initialization of a noise level estimate, a noise level estimating section 318 which performs the computation of the noise level estimate, a threshold updating section 319 which updates a threshold according to the noise level estimate, and a voice detecting section 320 which compares the transmission signal with the threshold to carry out voice detection.

The following description will then be directed to the operation of the thus-configured voice switching system of the second embodiment of the present invention with reference to FIG. 3.

The operations of the reception voice attenuator 302, transmission voice attenuator 305, signal level computing section 308, voice detecting section 313, signal level computing section 315, voice detecting section 320 and loss controlling section 321 are the same as those of their counterparts of the prior art shown in FIG. 7. The operations of the counting section 309, initialization performing section 310, noise level estimating section 311, counting section 316, initialization performing section 317 and noise level estimating section 318 are the same as those of their counterparts of the voice switching system of the first embodiment shown in FIG. 1.

The threshold updating section 312 is capable of updating the threshold according to the noise level estimate and the signal level. In the threshold updating section 312, the signal level computed in the signal level computing section 308 is compared with the value obtained by multiplying the noise level estimate computed in the initialization performing section 310 or the noise level estimating section 311 by a predetermined constant βmax to detect the beginning of a voice section. This constant βmax is set to be a value of 2.0 to 3.0 so that the beginning of the voice section can be detected but no changes in noise are detected.

When the signal level is higher than the noise level estimate multiplied by the constant βmax, a judgment coefficient β for updating the threshold is set to be a constant γ. The constant γ is a judgment coefficient in the voice section and is set to be a smaller value than the constant βmax, i.e., a value around 1.0.

When the signal level is lower than the noise level estimate multiplied by the constant βmax, the judgment coefficient β is updated by a predetermined updating amount "Lup". The updating amount "Lup" is a small value so as not to misdetect a relatively small voice in the voice section as noise, and the updating amount per second is set to be a value of 0.01 to 1 dB.

To prevent the updated judgment coefficient β from becoming too large, the updated judgment coefficient β is compared with the constant βmax, and when the judgment coefficient β is larger than the constant βmax, the judgment coefficient β is replaced by the constant βmax. Eventually, the threshold for voice detection is updated by multiplying the noise level estimate by the judgment coefficient β.

Although the description has been heretofore given to the receiving-side voice detection processing section 307, the transmitting-side voice detection processing section 314 carries out voice detection processing on a transmission signal in the same manner as the receiving-side voice detection processing section 307 does and, as described above, comprises the signal level computing section 315, the counting section 316, the initialization performing section 317, the noise level estimating section 318, the threshold updating section 319 and the voice detecting section 320.

As described above, the voice switching system of the second embodiment of the present invention has the effect that it is capable of computing a noise level estimate which has trackability to an unstationary noise whose level changes constantly, reducing the occurrence of misdetection of a voice under circumstances where the S/N ratio is low, detecting the presence or absence of a voice more distinctly, and carrying out more accurate voice detection than the conventional voice switching system by updating the threshold for voice detection according to the noise level estimate.

Figure 4:
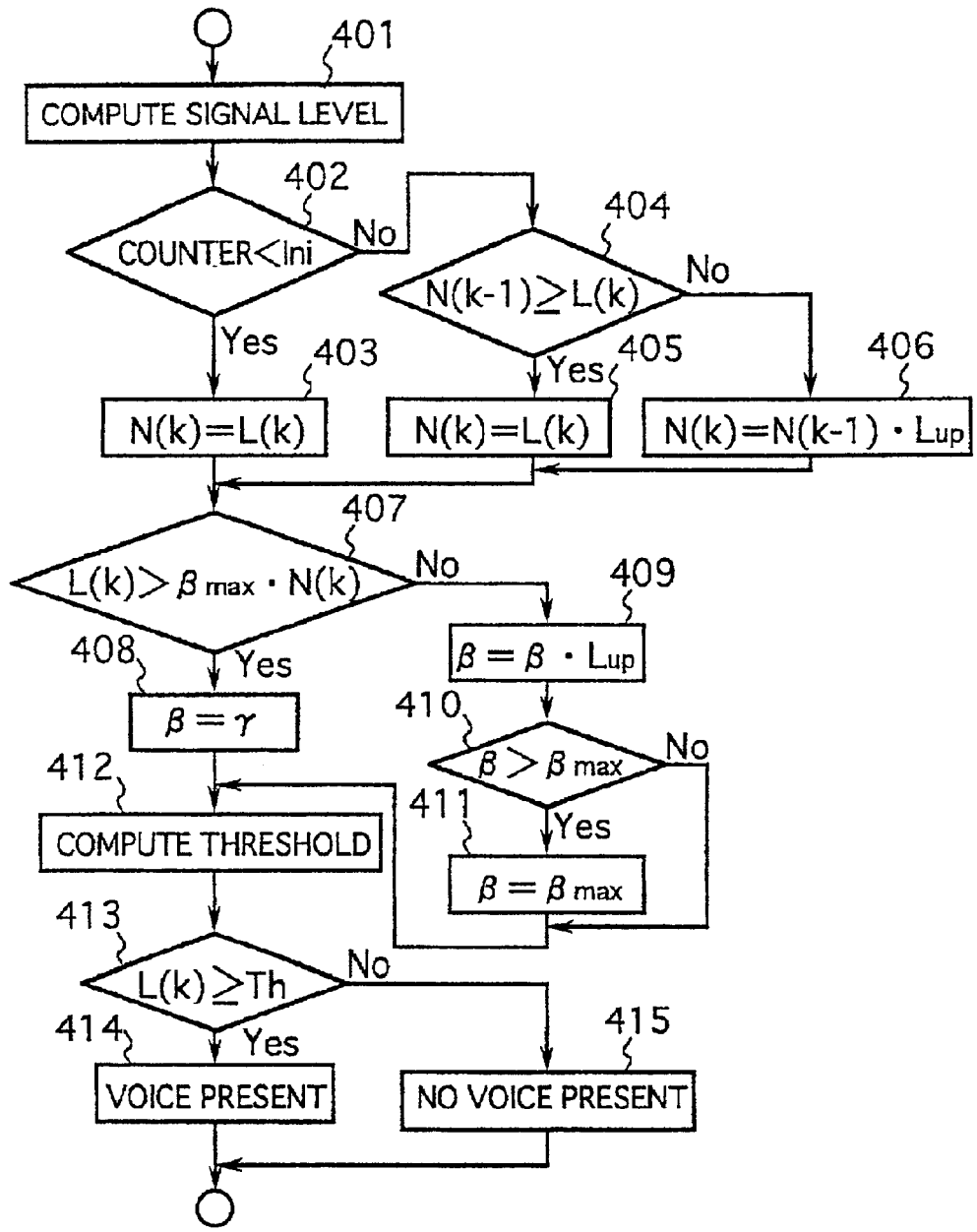
FIG. 4 is a flow diagram showing the process for implementing the second embodiment of the present invention by software.

FIG. 4 shows the process for implementing the second embodiment of the present invention by software.

The process shown in FIG. 4 comprises a plurality of processing steps consisting of a signal level computing step 401, a count comparing step 402, an initial noise level value setting step 403, a noise level comparing step 404, a noise level setting step 405, a noise level updating step 406, a level comparing step 407, a judgment coefficient setting step (1) 408, a judgment coefficient updating step 409, a judgment coefficient and threshold comparing step 410, a judgment coefficient setting step (2) 411, a threshold computing step 412, a voice detection comparing step 413, a voice detection judging step 414 and a no-voice detection judging step 415. These steps are the same as those carried out by the receiving-side voice detection processing section 307 comprising the signal level computing section 308 through the voice detecting section 313 and the transmitting-side voice detection processing section 314 comprising the signal level computing section 315 through the voice detecting section 320 which are shown in FIG. 3.

Figure 5:
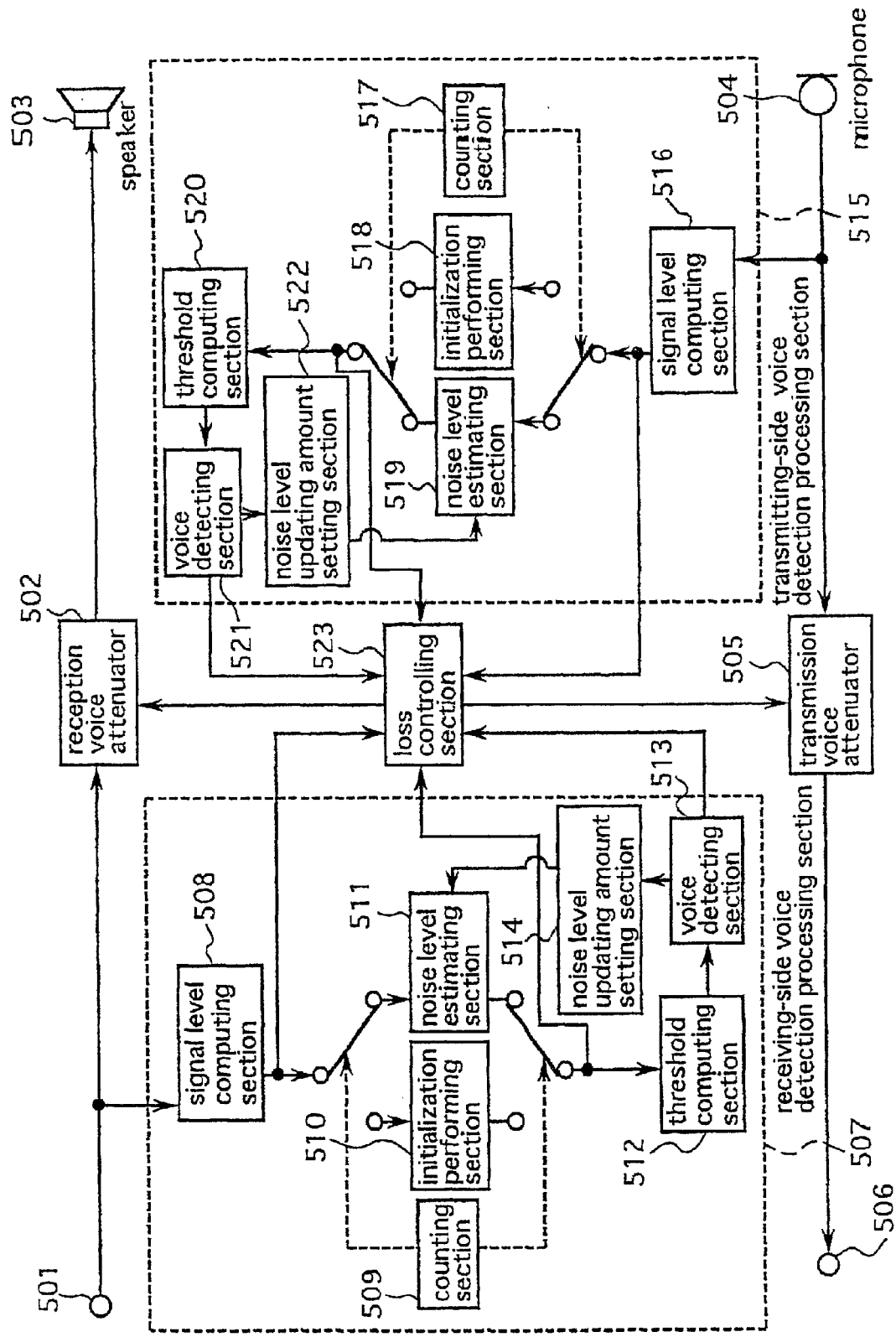
FIG. 5 is a block diagram of the third embodiment of the voice switching system according to the present invention.

FIG. 5 is a block diagram of the voice switching system of the third embodiment of the present invention.

As shown in FIG. 5, the voice switching system of the third embodiment of the present invention comprises a reception voice attenuator 502 which attenuates the reception signal inputted from a signal input terminal 501 and outputs the attenuated signal to a speaker 503, a transmission voice attenuator 505 which attenuates the transmission signal inputted from a microphone 504 and outputs the attenuated signal to an output terminal 506, a receiving-side voice detection processing section 507 in which voice detection processing is carried out on the inputted reception signal, a transmitting-side voice detection processing section 515 in which voice detection processing is carried out on the inputted transmission signal, and a loss controlling section 523 which controls the losses of the reception voice attenuator 502 and the transmission voice attenuator 505.

The receiving-side voice detection processing section 507 comprises a signal level computing section 508 adapted to compute the amplitude level of the reception signal inputted from the signal input terminal 501, a counting section 509 designed to count the number of samples or frames or the like after the activation of the voice switching system of the present invention, an initialization performing section 510 adapted to perform the initialization of a noise level estimate, a noise level estimating section 511 serving to perform the computation of the noise level estimate, a threshold computing section 512 adapted to compute a threshold from the noise level estimate, a voice detecting section 513 operative to compare the reception signal with the threshold to carry out voice detection, and a noise level updating amount setting section 514 designed to change the updating amount of the noise level estimate in the noise level estimating section 511 according to the result of the voice detection in the voice detecting section 513.

The transmitting-side voice detection processing section 515 further comprises a signal level computing section 516 adapted to compute the amplitude level of the transmission signal inputted from the microphone 504, a counting section 517 adapted to count the number of samples or frames or the like after the activation of the voice switching system of the present invention, an initialization performing section 518 serving to perform the initialization of a noise level estimate, a noise level estimating section 519 adapted to perform the computation of the noise level estimate, a threshold computing section 520 designed to compute a threshold from the noise level estimate, a voice detecting section 521 adapted to compare the transmission signal with the threshold to carry out voice detection, and a noise level updating amount setting section 522 which changes the updating amount of the noise level estimate in the noise level estimating section 519 according to the result of the voice detection in the voice detecting section 521.

The following description will be directed to the operation of the thus-configured voice switching system of the third embodiment of the present invention with reference to FIG. 5.

In FIG. 5, the operations of the reception voice attenuator 502, transmission voice attenuator 505, signal level computing section 508, threshold computing section 512, voice detecting section 513, signal level computing section 516, threshold computing section 520, voice detecting section 521 and loss controlling section 523 are the same as those of their counterparts of the prior art shown in FIG. 7. Further, the operations of the counting section 509, initialization performing section 510, noise level estimating section 511, counting section 517, initialization performing section 518 and noise level estimating section 519 are the same as those of their counterparts of the voice switching system of the first embodiment shown in FIG. 1.

Low power portions such as consonants are contained in a voice section. When the updating amount of the noise level estimate in the voice section is large in the noise level estimating section 511, the result of the voice detection in the voice detecting section 513 may change frequently within a short time period.

In the noise level updating amount setting section 514, when it is determined in the voice detecting section 513 that no voice is present, the updating amount per second which has been originally set in the noise level estimating section 511 is reset to be an updating amount of 3 to 10 dB, while when it is determined that a voice is present, the updating amount which has been originally set in the noise level estimating section 511 is reset to be a smaller updating amount. Thereby, more accurate voice detection becomes possible.

Although the description has been heretofore given to the receiving-side voice detection processing section 507, the transmitting-side voice detection processing section 515 carries out voice detection processing on a transmission signal in the same manner as the receiving-side voice detection processing section 507 does and, as described above, comprises the signal level computing section 516, the counting section 517, the initialization performing section 518, the noise level estimating section 519, the threshold computing section 520, the voice detecting section 521 and the noise level updating amount setting section 522.

As described above, the voice switching system of the third embodiment of the present invention has the effect that it is capable of computing a noise level estimate which has trackability to an unstationary noise whose level changes constantly, reducing the occurrence of misdetection of a voice under circumstances where the S/N ratio is low, detecting the presence or absence of a voice more distinctly, and carrying out more accurate voice detection having more trackability than the conventional voice switching system by changing the updating amount for the noise level estimate according to the result of the voice detection.

Figure 6:
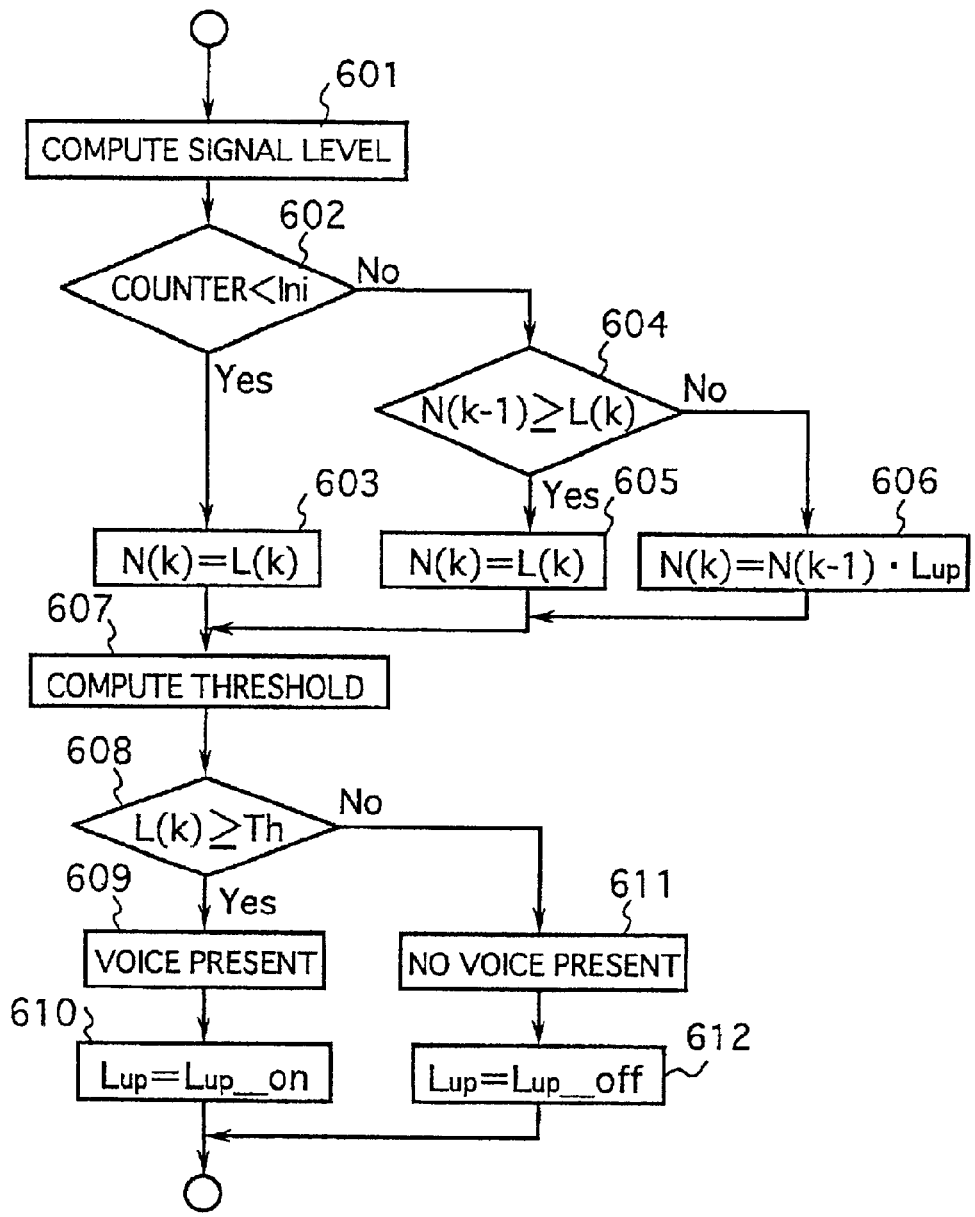
FIG. 6 is a flow diagram showing the process for implementing the third embodiment of the present invention by software.

FIG. 6 illustrates the process for implementing the third embodiment of the present invention by software.

In FIG. 6, the process comprises a plurality of processing steps consisting of a signal level computing step 601, a count comparing step 602, an initial noise level value setting step 603, a noise level comparing step 604, a noise level setting step 605, a noise level updating step 606, a threshold computing step 607, a voice detection comparing step 608, a voice detection judging step (1) 609, an updating amount setting step (1) 610, a voice detection judging step (2) 611, and an updating amount setting step (2) 612. The steps are the same as those carried out by the receiving-side voice detection processing section 507 comprising the signal level computing section 508 through the noise level updating amount setting section 514 and the transmitting-side voice detection processing section 515 comprising the signal level computing section 516 through the noise level updating amount setting section 522 which are shown in FIG. 5.

As described above, the voice switching system of the present invention comprises a receiving-side voice detection processing section which carries out the voice detection processing of a reception signal, a transmitting-side voice detection processing section which carries out the voice detection processing of a transmission signal, a reception voice attenuator which attenuates the above reception signal, a transmission voice attenuator which attenuates the above transmission signal, and a loss controlling section which controls the losses of the above reception voice attenuator and the above transmission voice attenuator according to the results of the voice detection processings of the above receiving-side voice detection processing section and the above transmitting-side voice detection processing section. The above receiving-side voice detection processing section and the above transmitting-side voice detection processing section each comprises a signal level computing section which computes the amplitude level of the above reception signal or the above transmission signal in each predetermined sample or frame, a noise level estimating section which computes a noise level estimate from the signal outputted from this signal level computing section, a threshold computing section which computes a threshold for detecting a voice from the above noise level estimate, and a voice detecting section which compares the above reception signal or the above transmission signal with the above threshold to detect a voice.

Therefore, according to the present invention, a noise level estimate having trackability to an unstationary noise whose level changes constantly can be computed, the occurrence of misdetection of a voice can be reduced even under circumstances where the S/N ratio is low, the presence or absence of a voice can be detected more distinctly, and more accurate voice detection than the conventional voice switching system can be carried out.

What is claimed is:

1. A voice switching system comprising a receiving-side voice detection processing section which carries out the voice detection processing of a reception signal, a transmitting-side voice detection processing section which carries out the voice detection processing of a transmission signal, a reception voice attenuator which attenuates the reception signal, a transmission voice attenuator which attenuates the transmission signal, and a loss controlling section which controls the losses of the reception voice attenuator and the transmission voice attenuator according to the results of the voice detection processings of the receiving-side voice detection processing section and the transmitting-side voice detection processing section, wherein the receiving-side voice detection processing section and the transmitting-side voice detection processing section each comprises a signal level computing section which computes the amplitude level of the reception signal or the transmission signal in each predetermined sample or frame, a noise level estimating section which computes a noise level estimate from the signal outputted from the signal level computing section, a threshold computing section which computes a threshold for detecting a voice from the noise level estimate, and a voice detecting section which compares the reception signal or the transmission signal with the threshold to detect a voice.

2. A voice switching system comprising a receiving-side voice detection processing section which carries out the voice detection processing of a reception signal, a transmitting-side voice detection processing section which carries out the voice detection processing of a transmission signal, a reception voice attenuator which attenuates the reception signal, a transmission voice attenuator which attenuates the transmission signal, and a loss controlling section which controls the losses of the reception voice attenuator and the transmission voice attenuator according to the results of the voice detection processings of the receiving-side voice detection processing section and the transmitting-side voice detection processing section, wherein the receiving-side voice detection processing section and the transmitting-side voice detection processing section each comprises a signal level computing section which computes the amplitude level of the reception signal or the transmission signal in each predetermined sample or frame, a noise level estimating section which computes a noise level estimate from the signal outputted from the signal level computing section, a threshold updating section which computes a threshold for detecting a voice from the noise level estimate and updates the threshold according to the noise level estimate and the signal level, and a voice detecting section which compares the reception signal or the transmission signal with the threshold to detect a voice.

3. The voice switching system of claim 2, wherein in the threshold updating section, when the signal level computed in the signal level computing section is higher than the value obtained by multiplying the noise level estimate computed in the noise level estimating section by a predetermined constant, a judgment coefficient for setting the threshold is set to be a predetermined small value; when the signal level is lower than the value obtained by multiplying the noise level estimate by the predetermined constant, the judgment coefficient is set to be a larger value progressively; and when the judgment coefficient becomes larger than a predetermined judgment value, the judgment coefficient is set to be the predetermined judgment value.

4. A voice switching system comprising a receiving-side voice detection processing section which carries out the voice detection processing of a reception signal, a transmitting-side voice detection processing section which carries out the voice detection processing of a transmission signal, a reception voice attenuator which attenuates the reception signal, a transmission voice attenuator which attenuates the transmission signal, and a loss controlling section which controls the losses of the reception voice attenuator and the transmission voice attenuator according to the results of the voice detection processings of the receiving-side voice detection processing section and the transmitting-side voice detection processing section, wherein the receiving-side voice detection processing section and the transmitting-side voice detection processing section each comprises a signal level computing section which computes the amplitude level of the reception signal or the transmission signal in each predetermined sample or frame, a noise level estimating section which computes a noise level estimate from the signal outputted from the signal level computing section, a threshold computing section which computes a threshold for detecting a voice from the noise level estimate, a voice detecting section which compares the reception signal or the transmission signal with the threshold to detect a voice, and an updating amount setting section which sets the updating amount of the noise level estimate in the noise level estimating section according to the result of the detection of the voice detecting section.

5. The voice switching system of claim 3, wherein in the updating amount setting section, when the signal level computed in the signal level computing section is higher than the threshold computed in the threshold computing section, it is determined that a voice is present, while when the signal level is lower than the threshold, it is determined that no voice is present, and the updating amount of the noise level estimate in the noise level estimating section is changed according to the result of the voice detection.

6. The voice switching system of any one of claims 1 to 5, which further comprises a counting section which counts the number of samples or frames or time after the activation of the system and an initialization performing section which performs the initialization of a noise level estimate for a predetermined time period, thereby performing the initialization of the noise level estimate for a predetermined time period after the activation of the system.

7. The voice switching system of any one of claims 1 to 5, wherein in the noise level estimating section, when the signal level is lower than the noise level estimate, the signal level is set to be the noise level estimate, while when the signal level is higher than the noise level estimate, the noise level estimate is set to be a larger value progressively.

8. A voice switching method performing a receiving-side voice detection processing step in which the voice detection processing of a reception signal is carried out, a transmitting-side voice detection processing step in which the voice detection processing of a transmission signal is carried out, a reception voice attenuating step in which the reception signal is attenuated, a transmission voice attenuating step in which the transmission signal is attenuated, and a loss controlling step in which the losses of the reception voice attenuating step and the transmission voice attenuating step are controlled according to the results of the voice detection processings of the receiving-side voice detection processing step and the transmitting-side voice detection processing step, wherein the receiving-side voice detection processing step and the transmitting-side voice detection processing step each performs a signal level computing step in which the amplitude level of the reception signal or the transmission signal is computed in each predetermined sample or frame, a noise level estimating step in which a noise level estimate is computed from the signal outputted from the signal level computing step, a threshold computing step in which a threshold for detecting a voice is computed from the noise level estimate, and a voice detecting step in which the reception signal or the transmission signal is compared with the threshold to detect a voice.

9. A voice switching method performing a receiving-side voice detection processing step in which the voice detection processing of a reception signal is carried out, a transmitting-side voice detection processing step in which the voice detection processing of a transmission signal is carried out, a reception voice attenuating step in which the reception signal is attenuated, a transmission voice attenuating step in which the transmission signal is attenuated, and a loss controlling step in which the losses of the reception voice attenuating step and the transmission voice attenuating step are controlled according to the results of the voice detection processings of the receiving-side voice detection processing step and the transmitting-side voice detection processing step, wherein the receiving-side voice detection processing step and the transmitting-side voice detection processing step each performs a signal level computing step in which the amplitude level of the reception signal or the transmission signal is computed in each predetermined sample or frame, a noise level estimating step in which a noise level estimate is computed from the signal outputted from the signal level computing step, a threshold updating step in which a threshold for detecting a voice is computed from the noise level estimate and updates the threshold according to the noise level estimate and the signal level, and a voice detecting step in which the reception signal or the transmission signal is compared with the threshold to detect a voice.

10. The voice switching method of claim 9, wherein in the threshold updating step, when the signal level computed in the signal level computing step is higher than the value obtained by multiplying the noise level estimate computed in the noise level estimating step by a predetermined constant, a judgment coefficient for setting the threshold is set to be a predetermined small value; when the signal level is lower than the value obtained by multiplying the noise level estimate by the predetermined constant, the judgment coefficient is set to be a larger value progressively; and when the judgment coefficient becomes larger than a predetermined judgment value, the judgment coefficient is set to be the predetermined judgment value.

11. A voice switching method performing a receiving-side voice detection processing step in which the voice detection processing of a reception signal is carried out, a transmitting-side voice detection processing step in which the voice detection processing of a transmission signal is carried out, a reception voice attenuating step in which the reception signal is attenuated, a transmission voice attenuating step in which the transmission signal is attenuated, and a loss controlling step in which the losses of the reception voice attenuating step and the transmission voice attenuating step are controlled according to the results of the voice detection processings of the receiving-side voice detection processing step and the transmitting-side voice detection processing step, wherein the receiving-side voice detection processing step and the transmitting-side voice detection processing step each performs a signal level computing step in which the amplitude level of the reception signal or the transmission signal is computed in each predetermined sample or frame, a noise level estimating step in which a noise level estimate is computed from the signal outputted from the signal level computing step, a threshold computing step in which a threshold for detecting a voice is computed from the noise level estimate, a voice detecting step in which the reception signal or the transmission signal is compared with the threshold to detect a voice, and an updating amount setting step in which the updating amount of the noise level estimate in the noise level estimating step is set according to the result of the detection of the voice detecting step.

12. The voice switching method of claim 11, wherein in the updating amount setting step, when the signal level computed in the signal level computing step is higher than the threshold computed in the threshold computing step, it is determined that a voice is present, while when the signal level is lower than the threshold, it is determined that no voice is present, and the updating amount of the noise level estimate in the noise level estimating step is changed according to the result of the voice detection.

13. The voice switching method of any one of claims 8 to 12, which further performs a counting step in which the number of samples or frames or time after the activation of the system is counted and an initialization performing step in which the initialization of a noise level estimate is performed for a predetermined time period, thereby performing the initialization of the noise level estimate for a predetermined time period after the activation of the system.

14. The voice switching method of any one of claims 8 to 12, wherein in the noise level estimating step, when the signal level is lower than the noise level estimate, the signal level is set to be the noise level estimate, while when the signal level is higher than the noise level estimate, the noise level estimate is set to be a larger value progressively.

* * * * *

UNITED STATES PATENT AND TRADEMARK OFFICE
CERTIFICATE OF CORRECTION

PATENT NO. : 6,816,591 B2
DATED : November 9, 2004
INVENTOR(S) : Yasuhiro Terada et al.

It is certified that error appears in the above-identified patent and that said Letters Patent is hereby corrected as shown below:

Title page,
Item [30], Foreign Application Priority Data, please delete "Apr. 14, 2000" and insert therefor -- Aug. 14, 2000 --.

Column 3,
Line 23, please delete "βh" and insert therefor -- αh --.

Signed and Sealed this

Fifteenth Day of February, 2005

JON W. DUDAS
*Director of the United States Patent and Trademark Office*